US012595842B2

(12) United States Patent
 Yamashita et al.

(10) Patent No.: US 12,595,842 B2
(45) Date of Patent: Apr. 7, 2026

(54) POWER TRANSMISSION DEVICE

(71) Applicants: JATCO LTD, Fuij (JP); Nissan Motor Co., Ltd., Yokohama (JP)

(72) Inventors: Katsunori Yamashita, Kanagawa (JP); Hirohisa Yukawa, Tokyo (JP); Masahiro Kouya, Kanagawa (JP); Tomoya Otaki, Kanagawa (JP); Tahei Toyoshima, Kanagawa (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/848,269

(22) PCT Filed: Mar. 23, 2023

(86) PCT No.: PCT/JP2023/011610
§ 371 (c)(1),
(2) Date: Sep. 18, 2024

(87) PCT Pub. No.: WO2023/182447
PCT Pub. Date: Sep. 28, 2023

(65) Prior Publication Data
US 2025/0215968 A1     Jul. 3, 2025

(30) Foreign Application Priority Data
Mar. 23, 2022    (JP) ................................ 2022-047606

(51) Int. Cl.
F16H 57/04          (2010.01)
(52) U.S. Cl.
CPC ..... F16H 57/0404 (2013.01); F16H 57/0441 (2013.01); F16H 57/0453 (2013.01); *F16H 57/0489* (2013.01)

(58) Field of Classification Search
CPC .............. F16H 57/0441; F16H 37/022; F16H 57/0453; F16H 57/0489
See application file for complete search history.

(56) References Cited

U.S. PATENT DOCUMENTS 9,573,085 B2 *  2/2017  Beer .................. F01M 11/0004
D821,445 S  *  6/2018  Buchen ........................... D15/5
(Continued)

FOREIGN PATENT DOCUMENTS

JP      H03-134368 A      6/1991
JP      2006-097767 A     4/2006
(Continued)

*Primary Examiner* — Anna M Momper
*Assistant Examiner* — Mark K Buse
(74) *Attorney, Agent, or Firm* — Spencer Fane LLP

(57)          ABSTRACT

A power transmission device for a vehicle includes a housing that accommodates a power transmission mechanism, a partition section that supports the power transmission mechanism and divides an interior of the housing, a strainer arranged at a bottom of the housing, and a pump supported by the partition section. The housing defines a first chamber located on one side of the partition section in a direction of an axis of rotation of the power transmission device, and a second chamber located on the other side of the partition section. The strainer has a first connection port that connects to the pump, and a second connection port that connects to a second oil path inside the partition section, the second connection port connecting to the second oil path from a direction of assembly of the pump onto the partition section.

6 Claims, 9 Drawing Sheets

(56) References Cited

U.S. PATENT DOCUMENTS

| | | | |
|---|---|---|---|
| 10,190,671 B2 * | 1/2019 | Kito ........................ | F04C 15/06 |
| 10,371,254 B2 | 8/2019 | Fukui et al. | |
| D921,045 S * | 6/2021 | Joughin .......................... | D15/5 |
| 11,028,741 B1 * | 6/2021 | Joughin ............. | F01M 11/0004 |
| 11,746,882 B2 * | 9/2023 | Rosendahl .............. | B03C 1/288 |
| | | | 184/6.25 |
| 2005/0133306 A1 * | 6/2005 | Lochocki, Jr. ...... | F16H 61/0003 |
| | | | 184/106 |
| 2006/0068963 A1 * | 3/2006 | Sugano ............... | F16H 61/0025 |
| | | | 475/206 |
| 2014/0116931 A1 * | 5/2014 | Beer ................. | F01M 11/0004 |
| | | | 210/196 |
| 2014/0144831 A1 * | 5/2014 | Rosendahl .......... | F16H 57/0404 |
| | | | 264/271.1 |
| 2016/0281842 A1 | 9/2016 | Fukui et al. | |

FOREIGN PATENT DOCUMENTS

| | | | |
|---|---|---|---|
| JP | 2013-249958 A | 12/2013 | |
| JP | 2015-045401 A | 3/2015 | |
| JP | 2021-105424 A | 7/2021 | |

* cited by examiner

Figure 3:
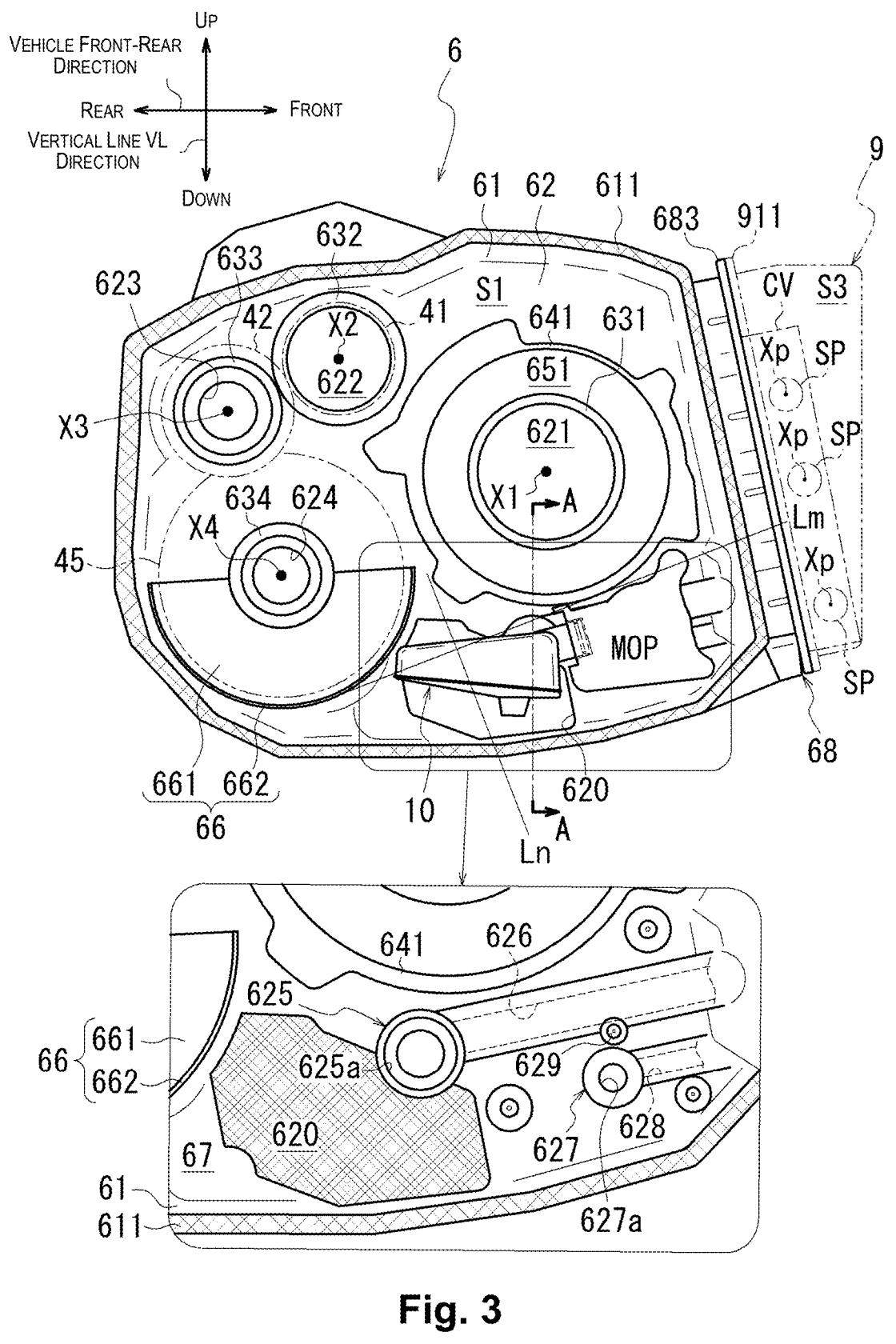

UP

VEHICLE FRONT-REAR
DIRECTION

REAR ← → FRONT

VERTICAL LINE VL
DIRECTION

DOWN

6

61 62 611 683 911 9

632 633 S1 641 631 CV S3

623 42 X2 41 Xp SP

X3 622 651 Xp SP

621

634 624 X1 → A Lm

45 X4 Xp

MOP

VEHICLE FRONT-REAR
DIRECTION

UP

REAR ← → FRONT

VERTICAL LINE VL
DIRECTION

DOWN

POWER TRANSMISSION DEVICE

CROSS-REFERENCE TO RELATED APPLICATIONS

This application is a U.S. national stage application of International Application No. PCT/JP2023/011610, filed on Mar. 23, 2023. This application also claims priority to Japanese Patent Application No. 2022-047606, filed on Mar. 23, 2022.

BACKGROUND

Technical Field

The present invention relates to a power transmission device.

Background Information

Japanese Patent Laid-Open Publication No. 2015-045401 discloses a drive device for a vehicle.

SUMMARY

This drive device provides a strainer for filtering oil drawn by a mechanical oil pump and an electric oil pump that is supported in cantilevered fashion by the mechanical oil pump.

During operation of a vehicle in which the power transmission device is mounted, vibration caused by the vehicle's motion is transmitted to the strainer. Therefore, greater support stability of the strainer is desired.

However, ensuring the support stability of the strainer may lead to an increase in the parts count, for example, which could potentially increase the size of the housing of the power transmission device.

Thus, there is a need to ensure the support stability of the strainer without enlarging the housing.

One aspect of the present disclosure is a power transmission device for a vehicle, comprising a housing that accommodates a power transmission mechanism, a partition section that supports the power transmission mechanism and divides the interior of the housing, a strainer arranged at the bottom of the housing, and a pump supported by the partition section, wherein inside the housing are provided a first chamber located on one side of the partition section in the direction of the axis of rotation of the power transmission mechanism, and a second chamber located on the other side of the partition section in the direction of the axis of rotation of the power transmission mechanism, the strainer includes a first connection port connecting to the pump, and a second connection port connecting to a second oil path within the partition section, and the second connection port is connected to the second oil path from the direction of assembly of the pump to the partition section.

According to one aspect of the present disclosure, the support stability of the strainer is improved.

BRIEF DESCRIPTION OF THE DRAWINGS

Referring now to the attached drawings which form a part of this original disclosure.

FIG. 3 is a view of a case from the second cover side.

DETAILED DESCRIPTION

Figure 1:
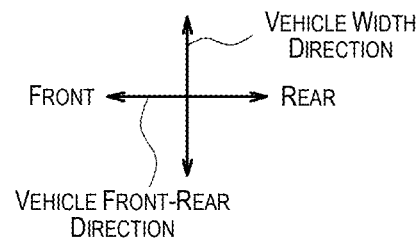
FIG. 1 is a schematic diagram illustrating the arrangement of a power transmission device in a vehicle.
Figure 1:
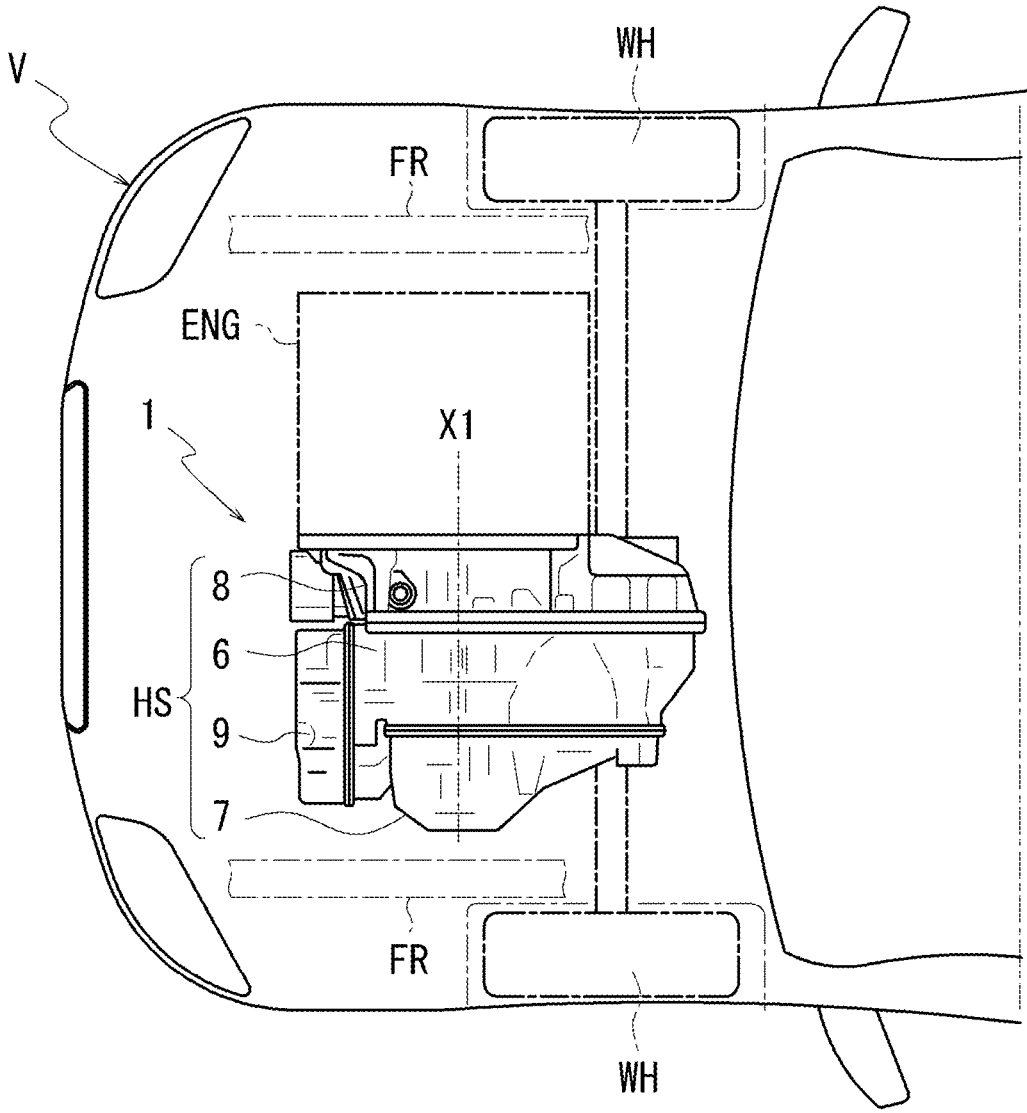

First, definitions of terminology in the present specification will be explained.

A power transmission device is a device having at least a power transmission mechanism, where the power transmission mechanism is, for example, at least one of a gear mechanism, a differential gear mechanism, or a reduction gear mechanism.

In the following embodiment, a case is illustrated in which a power transmission device 1 has a function for transmitting the output rotation of an engine, but the power transmission device 1 need only transmit the output rotation of at least one of an engine or a motor (rotating electrical machine).

"Overlaps as viewed from a prescribed direction" means that a plurality of elements are arranged in a prescribed direction, and means the same as "overlapping in a prescribed direction." "Prescribed direction" is, for example, the axial direction, radial direction, direction of gravity (vertical line VL direction), direction of travel of the vehicle (vehicle forward travel direction, vehicle rearward travel direction), etc.

If a plurality of elements (parts, sections, etc.) are shown arranged in a prescribed direction in the drawings, it may be assumed that there is text in the description in the specification indicating that the plurality of elements overlap when viewed in the prescribed direction.

"Not overlapping as viewed in a prescribed direction" and "offset when viewed in a prescribed direction" mean that a plurality of elements are not arranged in the prescribed direction, and mean the same as "not overlapping in a prescribed direction" and "offset in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown not arranged in a prescribed direction in the drawings, it may be assumed that there is text in the description in the specification indicating that the plurality of elements do not overlap when viewed in the prescribed direction.

"As viewed from a prescribed direction, a first element (part, section, etc.) is located between a second element (part, section, etc.) and a third element (part, section, etc.)" means that when viewed from the prescribed direction, the first element can be seen between the second element and the third element. The "prescribed direction" is, for example, the axial direction, radial direction, direction of gravity, direction of travel of the vehicle (forward movement direction of the vehicle, rearward movement direction of the vehicle), etc.

For example, if the second element, the first element, and the third element are arranged in that order in the axial direction, then the first element is located between the second element and the third element when viewed from the radial direction. If the first element is shown between the second element and the third element as viewed from a prescribed direction in the drawings, it may be assumed that there is text in the description in the specification describing the first element between the second element and the third element as viewed from the prescribed direction.

When two elements (parts, sections, etc.) overlap as viewed from the axial direction, the two elements are coaxial.

"Axial direction" means the axial direction of the axis of rotation of a part making up the device. "Radial direction" means a direction orthogonally intersecting the axis of rotation of the part making up the device. The part is, for example, a motor, a gear mechanism, a differential gear mechanism, or the like.

"The downstream side in the direction of rotation" means the downstream side in the direction of rotation when the vehicle is advancing or the direction of rotation during vehicle forward movement or during vehicle backward movement. It is appropriate to assume the downstream side in the direction of rotation is during vehicle forward movement, which is frequently the case.

"Upright" with reference to the control valve means that in the case of a control valve having a basic configuration with a separation plate sandwiched between valve bodies, the valve bodies of the control valve are stacked in the horizontal line direction based on the state of installation of the power transmission device in the vehicle. The "horizontal line direction" here does not mean the horizontal line direction in the strict sense, but also includes cases in which the direction of stacking is at an angle relative to the horizontal line.

Further, "upright" with respect to the control valve means that the control valve is arranged with the plurality of pressure regulating valves inside the control valve aligned in the direction of a vertical line VL based on the state of installation of the power transmission device in the vehicle.

"The plurality of pressure regulating valves aligned in the direction of a vertical line VL" means that the regulating valves inside the control valve are arranged spaced out in the direction of the vertical line VL.

In this case, the plurality of pressure regulating valves do not need to be strictly arranged in a single file in the direction of the vertical line VL.

For example, if the plurality of valve bodies are stacked to form the control valve, the following is possible. Namely, the plurality of pressure regulating valves may be arranged in the direction of the vertical line VL with shifted positions in the direction of stacking of the valve bodies in the upright control valve.

Further, as viewed from the axial direction of the valve bodies provided on the pressure regulating valves (the direction of forward and backward movement), the plurality of pressure regulating valves need not be arranged with gaps in between in the direction of the vertical line VL.

As viewed from the axial direction of the valve bodies provided with the pressure regulating valves (the direction of forward and backward movement), the plurality of pressure regulating valves need not be adjacent in the direction of the vertical line VL.

Hence, if, for example, the pressure regulating valves arranged in the direction of the vertical line VL are arranged with shifted positions in the stacking direction (horizontal line direction) of the valve bodies, then cases are also included in which, as viewed from the stacking direction, the pressure regulating valves that are adjacent in the direction of the vertical line VL are provided in a partially overlapping positional relationship.

Further, that the control valve is "upright" means that the plurality of pressure regulating valves inside the control valve are arranged in the direction of movement of the valve bodies (spool valves) provided in the pressure regulating valves aligned in the horizontal line direction.

The direction of movement of the valve bodies (spool valves) in this case is not limited to the horizontal line direction in the strict sense. The direction of movement of the valve bodies (spool valves) in this case is a direction along an axis of rotation X of the power transmission device. In this case, the direction of the axis of rotation X and the sliding direction of the valve bodies (spool valves) are the same.

An embodiment of the present invention is described below.

FIG. 1 is a schematic diagram illustrating the arrangement of a power transmission device 1 in a vehicle V.

Figure 2:
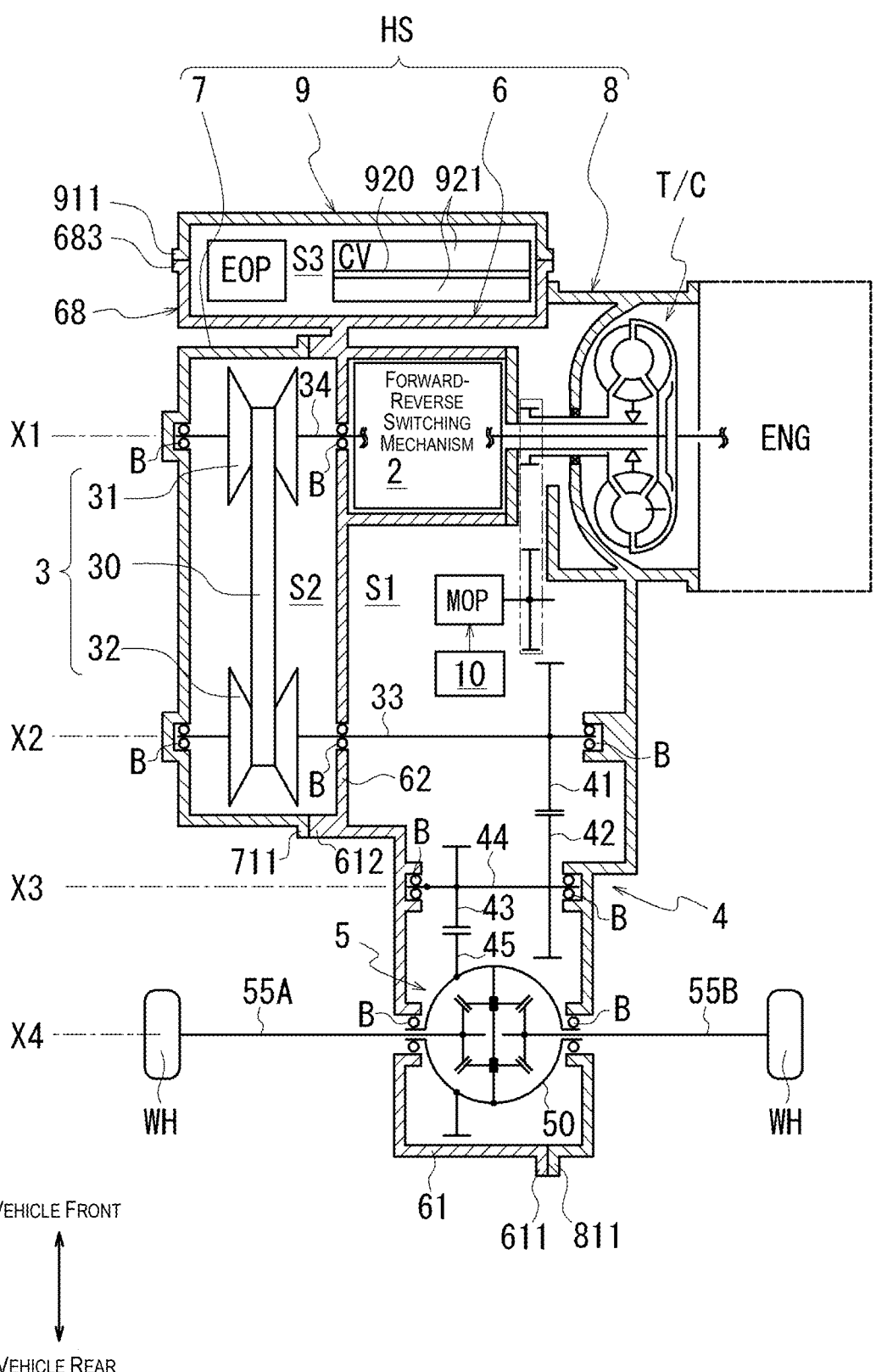
FIG. 2 is a schematic diagram illustrating a general configuration of the power transmission device.

FIG. 2 is a schematic diagram illustrating a general configuration of the power transmission device 1.

As shown in FIG. 1, the power transmission device 1 in the front of the vehicle V is arranged between left and right frames FR, FR. A housing HS of the power transmission device 1 is configured by a case 6, a first cover 7, a second cover 8, and a third cover 9.

As shown in FIG. 2, the interior of the housing HS accommodates a torque converter T/C, a forward-reverse switching mechanism 2, a variator 3, a reduction mechanism 4, a differential drive device 5, an electronic oil pump EOP, a mechanical oil pump MOP, a control valve CV, etc.

In the power transmission device 1, output rotation of an engine ENG (the drive source) is input into the forward-reverse switching mechanism 2 via the torque converter T/C.

The rotation input to the forward-reverse switching mechanism 2 is forward rotation or reverse rotation and is input to a primary pulley 31 of the variator 3.

In the variator 3, changing the winding radius of a belt 30 in the primary pulley 31 and a secondary pulley 32 causes the rotation input to the primary pulley 31 to be shifted at a desired gear ratio and output by an output shaft 33 of the secondary pulley 32.

Output rotation of the secondary pulley 32 is input via the reduction mechanism 4 into the differential drive mechanism 5 (differential gear mechanism) and is then transmitted to drive wheels WH, WH via left and right drive shafts 55A, 55B.

The reduction mechanism 4 has an output gear 41, an idler gear 42, a reduction gear 43, and a final gear 45.

The output gear 41 rotates together with the output shaft 33 of the secondary pulley 32.

The idler gear 42 meshes with the output gear 41 in a manner allowing transmission of rotation. The idler gear 42 is spline-fitted to an idler shaft 44 and rotates together with the idler shaft 44. The idler shaft 44 is provided with the reduction gear 43 that has a smaller radius than the idler gear 42. The reduction gear 43 meshes with the final gear 45 that is fixed to the outer circumference of a differential case 50 of the differential device 5 in a manner allowing transmission of rotation.

In the power transmission device 1, the forward-reverse switching mechanism 2, the torque converter T/C, and the output shaft of the engine ENG are arranged coaxially (concentrically) along an axis of rotation X1 (first axis) of the primary pulley 31.

The output shaft 33 of the secondary pulley 32 and the output gear 41 are arranged coaxially along an axis of rotation X2 (second axis) of the secondary pulley 32.

The idler gear 42 and the reduction gear 43 are arranged coaxially along a common axis of rotation X3.

The final gear 45 and the drive shafts 55A, 55B are arranged coaxially on a common axis of rotation X4. In the power transmission device 1, the axes of rotation X1-X4 are set to have a positional relationship parallel to each other. In the following, the axes of rotation X1-X4 may, as needed, referred to as the axis of rotation X of the power transmission device 1 (power transmission mechanism).

Figure 4:
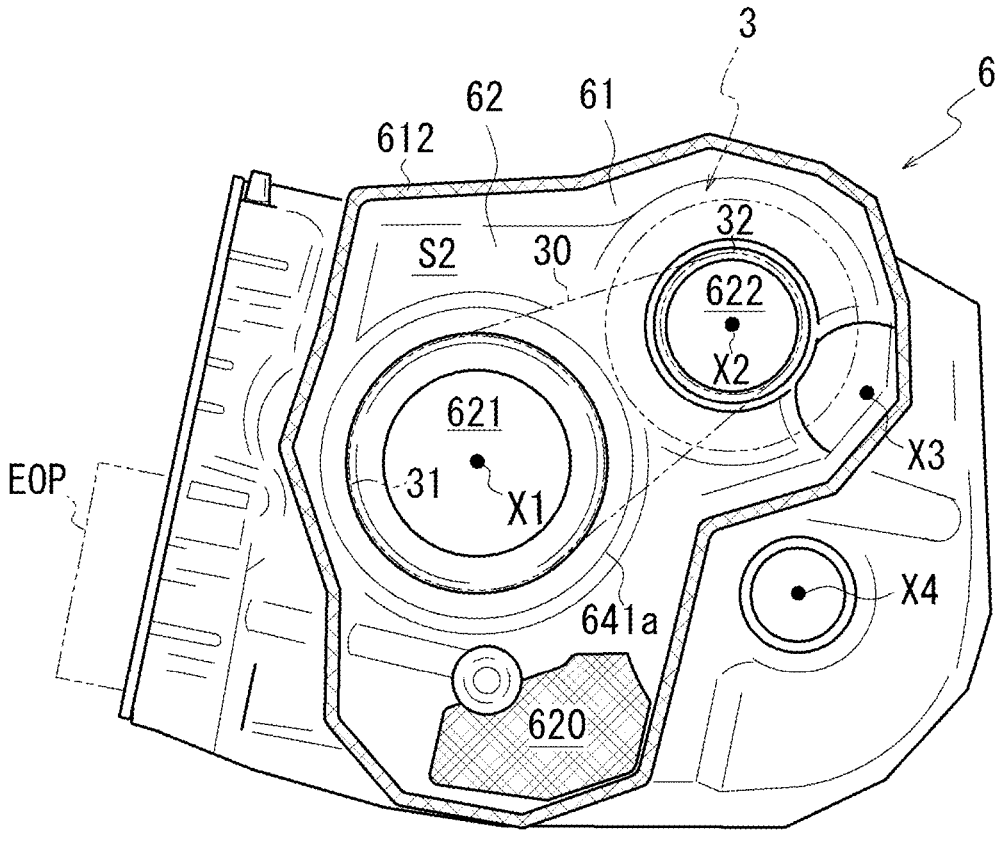
FIG. 4 is a view of the case from the first cover side.
Figure 4:
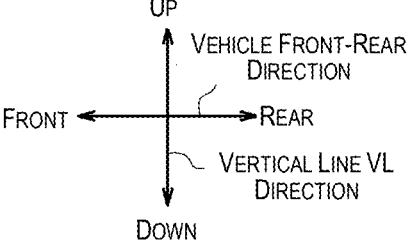

FIG. 3 is a plan view of the case 6 as viewed from the second cover 8 side. FIG. 4 is a plan view of the case 6 as viewed from the first cover 7 side. Note that in the enlarged view of FIG. 3, a strainer 10 and the mechanical oil pump MOP are omitted, showing the areas around connection sections 625, 627 provided in a partition section 62. Further, in the enlarged views of FIGS. 3 and 4, crosshatching is applied to the region of the opening 620 to clarify the location of the opening 620.

Figure 5:
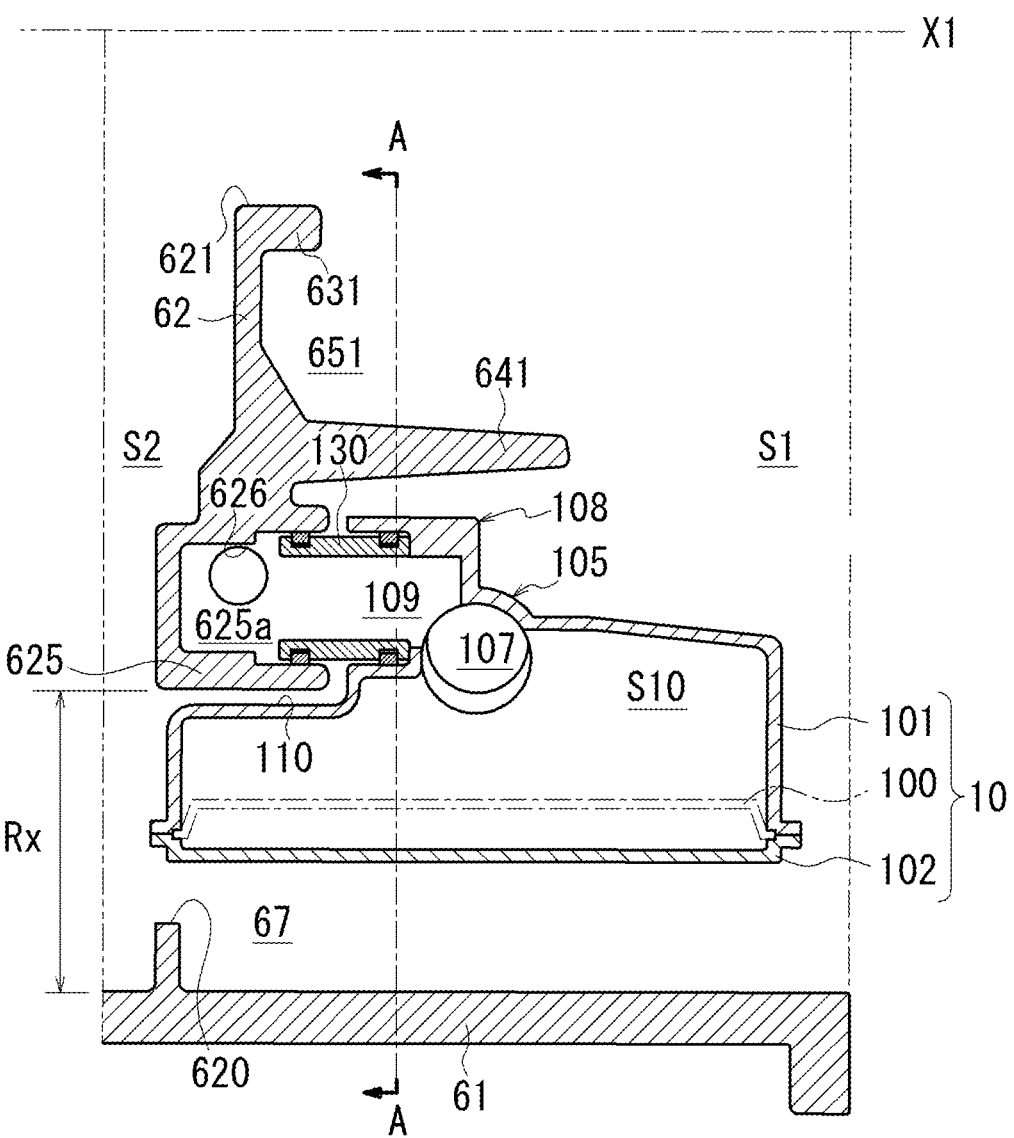
FIG. 5 is a cross-sectional diagram of a housing section.
Figure 6:
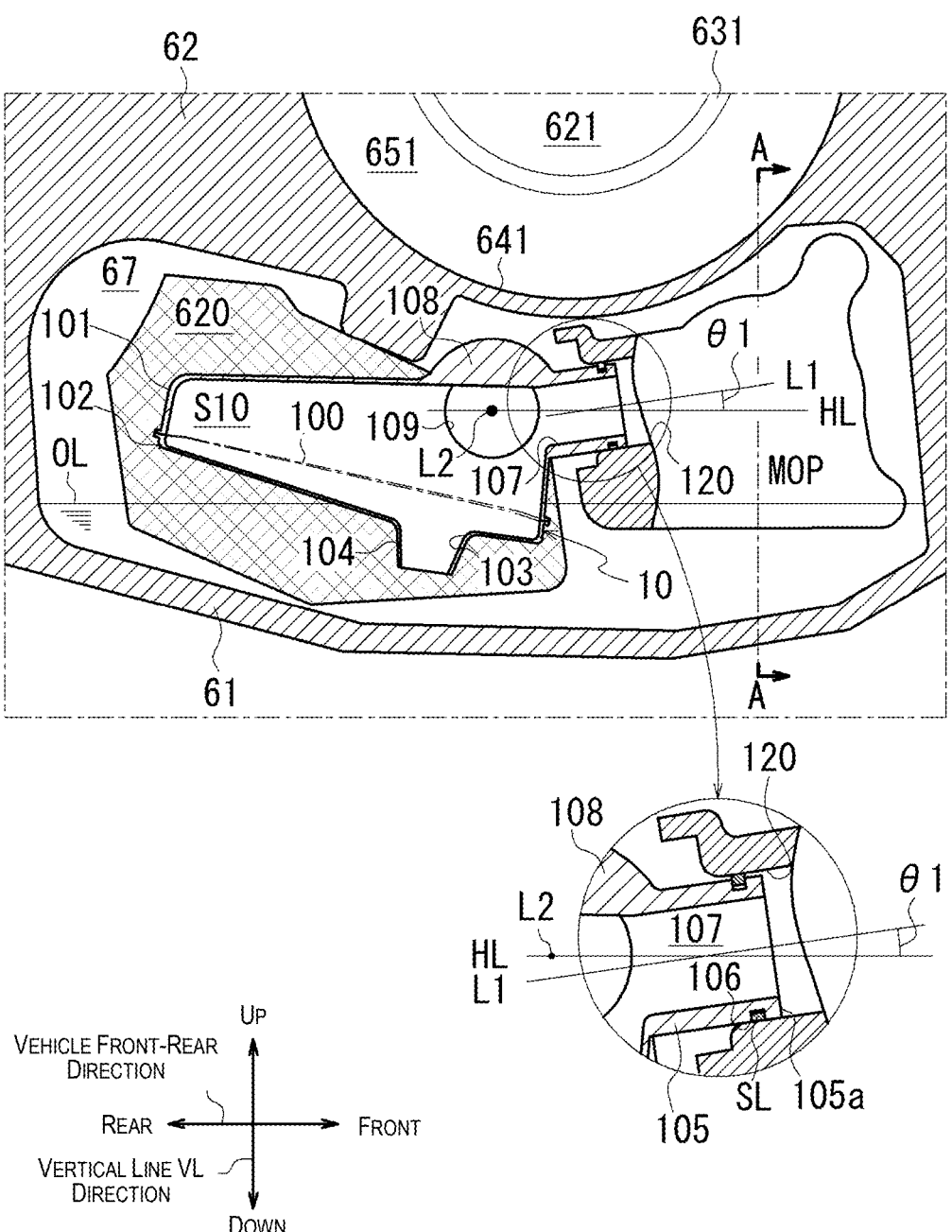
FIG. 6 is a cross-sectional diagram of the housing section.
Figure 7:
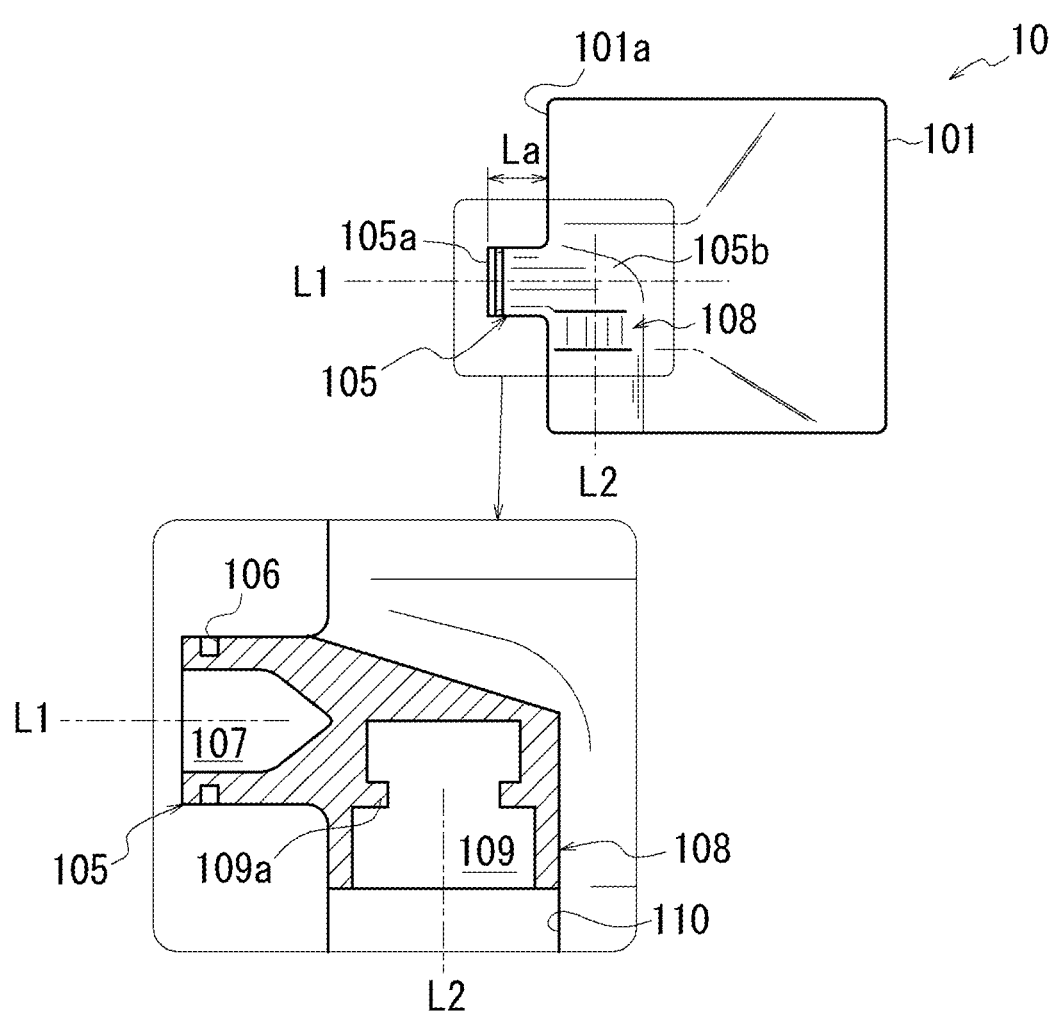
FIG. 7 is a diagram of a strainer.
Figure 8:
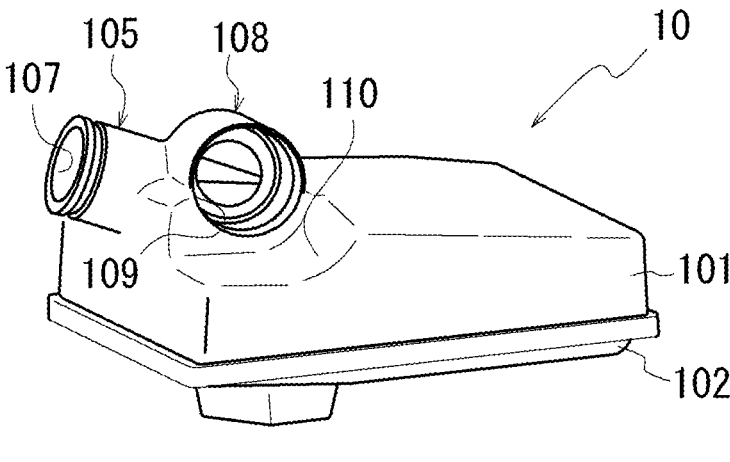
FIG. 8 is a view of the strainer.

FIG. 5 is an enlarged cross-sectional view of a key part of the case 6 through line A-A in FIG. 3. FIG. 6 is an enlarged cross-sectional view of a key part of the case 6 through line A-A in FIG. 5. FIG. 7 is a plan view of the strainer 10 as viewed from above on the side of the upper case 101. In the enlarged view of FIG. 7, the area around a discharge path 107 and a discharge path 109 in the strainer 10 is shown in cross section to clarify the positional relationship between the discharge path 107 and the discharge path 109. FIG. 8 is a perspective view of the strainer 10 as seen from diagonally above on the side of the upper case 101.

As shown in FIG. 3, the case 6 has a cylindrical circumferential wall section 61 and the partition section 62. The partition section 62 cuts across the axes of rotation (axes of rotation X1 to X4) of the power transmission mechanism.

As shown in FIG. 2, the partition section 62 divides the space inside the circumferential wall section 61 in two in the direction of the axis of rotation X1. One side of the partition section 62 in the direction of the axis of rotation X1 is a first chamber S1, and the other side is a second chamber S2.

The first chamber S1 accommodates the forward-reverse switching mechanism 2, the reduction mechanism 4, and the differential device 5. The second chamber S2 accommodates the variator 3.

In the case 6, an opening on the first chamber S1 side is sealed by the second cover 8 (torque converter cover). The second chamber S2 side opening is sealed by the first cover 7 (side cover).

In the case 6, oil used for the operation of the power transmission device 1 or lubrication of the component elements of the power transmission device 1 is collected below the space between the first cover 7 and the second cover 8 (first chamber S1 and second chamber S2).

As shown in FIG. 3, the end surface of the case 6 on the second cover 8 side (toward the viewer) is a joining section 611 with the second cover 8. The joining section 611 is a flanged section that surrounds the entire circumference of the opening on the second cover 8 side of the partition section 62. The joining section 811 is joined to the entire circumference of the joining section 611 on the second cover 8 side (see FIG. 2). The case 6 and the second cover 8 are connected by bolts, not shown, to join the joining sections 611 and 811 together. The opening of the case 6 is thus held in a state sealed by the second cover 8, forming the closed first chamber S1.

As shown in FIG. 3, in the case 6, the partition section 62 is located inside the joining section 611.

The partition section 62 of the case 6 is provided in a direction essentially orthogonal to the axes of rotation (axes of rotation X1 to X4). Through-holes 621, 622, 624 and a support hole 623 are formed in the partition section 62.

The through-hole 621 is formed around the axis of rotation X1. A cylindrical support wall section 631 surrounding the through-hole 621 and a circumferential wall section 641 surrounding the outer circumference of the cylindrical support wall section 631 with a space in between are provided in the surface of the partition section 62 facing the first chamber S1 (toward the viewer). The cylindrical support wall section 631 and the circumferential wall section 641 project toward the viewer in FIG. 3 (toward the second cover 8 in FIG. 2)

The region 651 between the support wall section 631 and the circumferential wall section 641 is a cylindrical space that accommodates a piston (not shown) of the forward-reverse switching mechanism 2, friction plates (forward clutch, reverse brake), etc.

An input shaft 34 (see FIG. 2) of the primary pulley 31 is rotatably supported on the inner circumference of the cylindrical support wall section 631 via bearings B.

As shown in FIG. 3, the through-hole 622 is formed around the axis of rotation X2.

In the power transmission device 1 mounted in the vehicle V, the axis of rotation X2 is positioned diagonally above toward the rear of the vehicle as viewed from the axis of rotation X1.

A cylindrical support wall section 632 that surrounds the through-hole 622 is provided on the surface of the partition section 62 facing the first chamber S1 (toward the viewer). The support wall section 632 projects toward the viewer in FIG. 3 (toward the side of the torque converter cover 8 in FIG. 2).

The inner circumference of the support wall section 631 supports an output shaft 33 (see FIG. 2) of the secondary pulley 32 rotatably via the bearings B.

As shown in FIG. 3, the support hole 623 is a closed-bottom hole formed around the axis of rotation X3.

In the power transmission device 1 mounted in the vehicle V, the axis of rotation X3 is positioned diagonally above toward the rear of the vehicle as viewed from the axis of rotation X1, and diagonally below toward the rear of the vehicle as viewed from the axis of rotation X2.

On the surface of the partition section 62 on the first chamber S1 side (toward the viewer), a cylindrical support wall section 633 that surrounds the support hole 623 is provided. In FIG. 3, the support wall section 633 protrudes toward the viewer (the second cover 8 side in FIG. 2). The support wall section 633 surrounds the outer circumference of the support hole 623 with a gap therebetween. The inner circumference of the support wall section 633 supports one end of the idler shaft 44 of the reduction mechanism 4 (see FIG. 2) rotatably via bearings B.

As shown in FIG. 3, the through-hole 624 is formed around the axis of rotation X4.

In the power transmission device 1 mounted in the vehicle V, the axis of rotation X4 is positioned diagonally below toward the rear of the vehicle as viewed from the axis of rotation X1, diagonally below toward the rear of the vehicle as viewed from the axis of rotation X2, and diagonally below toward the front of the vehicle as viewed from the axis of rotation X3.

On the surface of the partition section 62 on the first chamber S1 side (toward the viewer), a cylindrical support wall section 634 that surrounds the through-hole 624 is provided. In FIG. 3, the support wall section 634 protrudes toward the viewer (the second cover 8 side in FIG. 2). The support wall section 634 surrounds the outer circumference of the through-hole 624 with a gap therebetween. The inner circumference of the support wall section 634 rotatably supports the differential case 50 of the differential device 5 (see FIG. 2) via the bearings B.

As shown in FIG. 2, the final gear 45, in the form of a ring as viewed from the direction of the axis of rotation X4, is fixed to the outer circumference of a differential case 50. The final gear 45 rotates about the axis of rotation X4 together with the differential case 50.

As shown in FIG. 3, on the surface of the partition section 62 facing the first chamber S1 (toward the viewer), a baffle plate 66 is attached below the through-hole 624. As viewed from the direction of the axis of rotation X4, the baffle plate 66 forms a semi-circular shape curved downward, and has side plate sections 661 that cover both side surfaces of the final gear 45 in the direction of the axis of rotation X4, and an arcuate wall section 662 that covers the outer circumference in the radial direction of the axis of rotation X4 (see FIG. 10). Note that the side plate section 661 toward the viewer is omitted in FIG. 3.

In the case 6, the region toward the front of the vehicle from the arcuate wall section 662 of the baffle plate 66 below the arcuate circumferential wall section 641 forms a plastic strainer 10 housing section 67.

As shown in FIG. 5, the housing section 67 is a closed-end space with an opening facing the first chamber S1 side (right side in FIG. 5).

The partition section 62 is such that a lower region Rx on the side of the case 6 facing the circumferential wall section 61 serves as the bottom wall section in the direction of the axis of rotation X1 of the housing section 67. In the direction of the axis of rotation X1, the lower region Rx is located farther toward the second chamber S2 side (left side in the diagram) than the partition section 62. That is, as viewed from the radial direction of the axis of rotation X1, the partition section 62 and the lower region Rx are provided offset in the direction of the axis of rotation X1.

Therefore, in the lower part of the case 6, the housing section 67 is formed across a range that crosses the direction of the axis of rotation X1 below the area 651 (recess) where the forward-reverse switching mechanism 2 is housed.

An opening 620 is formed in the lower region Rx that passes through said lower region Rx in the direction of the axis of rotation X1. The first chamber S1 and the second chamber S2 inside the case 6 are interconnected through this opening 620.

As shown in FIG. 3, the opening 620, as viewed from the direction of the axis of rotation X1, is provided in a location that intersects a tangent line Lm. The tangent line Lm is a straight line connecting the outer circumference of the circumferential wall section 641 and the outer circumference of the arcuate wall section 662 of the baffle plate 66.

The opening 620 is formed from the region between the circumferential wall section 641 and the arcuate wall section 662, extending along a straight line Ln, crossing the tangent line Lm from above to below and to the bottom of the case 6. Here, the straight line Ln is a line that passes between the circumferential wall section 641 and the arcuate wall section 662 and intersects the tangent line Lm at a right angle.

In the power transmission device 1, the region between the circumferential wall section 641 and the arcuate wall section 662 tends to be unused dead space, but this dead space can be effectively utilized by providing the opening 620.

As shown in FIG. 5, in the lower region Rx, the connection section 625 of the strainer 10 is provided adjacent to the circumferential wall section 641 in the radial direction of the axis of rotation X1. The connection section 625 is a cylindrical part with a connection port 625a facing the second cover 8 side (first chamber S1).

As shown in FIG. 3, as viewed from the direction of the axis of rotation X1, the connection section 625 is provided in a positional relationship such that a region in part of the lower side overlaps the opening 620. The region in part of the lower side of the connection section 625, as viewed from the direction of the axis of rotation X1, projects into opening 620.

As shown in FIG. 5, an oil path 626 opens on the rear side of the connection section 625.

As shown in FIG. 3, the oil path 626 extends in a straight line from the opening 620 in a direction away from the partition section 62. The oil path 626 connects to an electric oil pump EOP housed in the housing section 68, described below, through an oil path inside the case 6.

In the housing section 67, a connection section 627 for the mechanical oil pump MOP is provided below the oil path 626. A connection port 627a of the connection section 627 opens in the same direction as the connection section 625 of the strainer 10. The connection port 627a of the connection section 627 communicates with an oil path 628 (first oil path) provided in the partition section 62.

The oil path 628 extends from the lower side of the oil path 626 along the oil path 626 toward the housing section 68 side (to the right in the diagram). The oil path 628 connects to a control valve CV (see FIG. 2) installed in a housing chamber S3, described below, through an oil path in the case 6.

As shown in FIG. 2, a housing section 68 having an opening facing the front of the vehicle is attached to the side surface of the case 6 facing the front of the vehicle. The housing chamber S3 is formed by sealing the opening of the housing section 68 with the third cover 9.

The housing section 68 and the third cover 9 are connected by bolts, not shown, to join the joining sections 683, 911 together. This forms the closed housing chamber S3 on the side surface of the case 6 toward the front of the vehicle.

The control valve CV and the electric oil pump EOP are arranged upright in the housing chamber S3.

The control valve CV has a basic configuration in which a separation plate 920 is sandwiched between valve bodies 921, 921. Inside the control valve CV, an oil pressure control circuit (not shown) is formed. The oil pressure control circuit is provided with pressure regulating valves SP (spool valves) that operate based on a solenoid driven by commands from a control device (not shown) and the signal pressure generated by the solenoid.

In the housing chamber S3, the control valve CV is upright, so that that the stacking direction of the valve bodies 921, 921 is aligned in the front-rear direction of the vehicle (vertical direction in the plane of the paper).

In the housing chamber S3, the control valve CV is upright so as to satisfy the following conditions. (a) A plurality of pressure regulating valves SP (spool valves) inside the control valve CV are aligned in the vertical line VL direction (vertical direction) based on the state of installation of the power transmission device 1 in vehicle V (see FIG. 3), and (b) the direction of advancement and retraction Xp of the pressure regulating valves SP (spool valves) is along the horizontal line direction (see FIG. 3).

Advancement and retraction of the pressure regulating valves SP (spool valves) is thus not hindered, and the control valve CV is upright in the housing chamber S3. Thus, the housing chamber S3 is prevented from becoming larger in the front-rear direction of the vehicle.

Note that the electric oil pump EOP is arranged upright, aligning the axis of rotation of the motor (not shown) in the vertical line VL direction.

As shown in FIG. 2, the electric oil pump EOP and the control valve CV are aligned in the direction of the axis of rotation X of the power transmission mechanism.

As shown in FIG. 3, in the lower part of the case 6, the opening 620 is provided below the circumferential wall section 641. The opening 620 is positioned toward the front of the vehicle from the arcuate wall section 662 of the baffle plate 66 and is provided along the inner circumference of the circumferential wall section 61 (the joining section 611). As viewed from the direction of the axis of rotation X1, the opening 620 is formed large enough to insert at least part of the strainer 10.

As shown in FIG. 4, on the surface of the case 6 facing the first cover 7, the partition section 62 is located inside the circumferential wall section 61 that surrounds the second chamber S2. The opening 620 is positioned below the partition section 62, and the through-holes 621, 622 are open above the opening 620.

On the end surface of the circumferential wall section 61 facing the first cover 7, a joining section 612 with the first cover 7 is provided. The joining section 612 is a flanged section that surrounds the entire circumference of the opening on the first cover 7 side of the partition section 62. The partition section 62 is located inside the joining section 612.

The joining section 612 is joined by the entire circumference to the joining section 711 on the first cover 7 side (see FIG. 2). The case 6 and the first cover 7 are connected by bolts, not shown, to join the joining sections 612, 711 together. Thus, the opening of the case 6 is sealed by the first cover 7, forming the closed second chamber S2.

As shown in FIG. 4, the through-hole 621 is positioned diagonally above toward the front of the vehicle as viewed from the opening 620. The through-hole 622 is located diagonally above toward the rear of the vehicle as viewed from the through-hole 621.

Inside the circumferential wall section 61, the primary pulley 31 and the secondary pulley 32 of the variator 3 are positioned in the upper region in the direction of the vertical line VL.

The area of the circumferential wall section 61 where the primary pulley 31 is located bulges significantly downward toward the bottom of the case 6, and the opening 620 is positioned at the lowest part of this bulging area.

During the operation of the power transmission device 1, the oil OL supplied through an oil path, not shown, is discharged toward the belt 30 of the variator 3 in the second chamber S2, lubricating the belt 30 of the variator 3.

The oil OL that lubricates the belt 30 moves toward the lower part where the opening 620 is provided within the second chamber S2 due to gravity, passes through the opening 620, and returns to the lower part of the first chamber S1 where the strainer 10 is arranged.

As shown in FIGS. 5 and 6, the strainer 10 has a basic configuration in which a filter 100 is placed within a space S10 formed between the upper case 101 and the lower case 102.

The lower case 102 is provided with an opening 103 that connects the space S10 inside the strainer 10 with the exterior of the strainer 10. A circumferential wall 104 that surrounds the opening 103 is formed in a projecting manner on the outer surface of the lower case 102.

As shown in FIG. 7, as viewed from above, the strainer 10 has an essentially rectangular shape. A cylindrical first connection section 105 is provided on one side 101a of the upper case 101. As viewed from above, the first connection section 105 is positioned at the approximate center along the longitudinal direction (vertical direction in FIG. 7) of the one side 101a and is oriented orthogonal to the side 101a./

The first connection section 105 extends linearly away from the one side 101a along a straight line L1. A tip 105a of the first connection section 105 reaches a position spaced a prescribed distance La from the one side 101a. Here, the straight line L1 passes approximately midway along the longitudinal direction (vertical direction in the diagram) of the one side 101a and is orthogonal to one side 101a.

A ring groove 106 that surrounds the entire circumference of the first connection section 105 is provided at the tip 105a side of the first connection section 105.

As shown in FIG. 6, the tip 105a side of the first connection section 105 is inserted into the connection port 120 of the mechanical oil pump MOP when the strainer 10 is connected to the mechanical oil pump MOP. A sealing ring SL fitted into the ring groove 106 seals the gap between the outer circumference of the first connection section 105 and the inner circumference of the connection port 120.

The interior of the first connection section 105 serves as the oil discharge path 107 of the strainer 10, and the opening of the discharge path 107 is a first discharge outlet for the oil OL in the strainer 10.

As shown in FIG. 7, a second connection section 108 is provided on a base 105b side of the first connection section 105. The second connection section 108 is a closed-bottom cylinder that has a discharge path 109 for the oil OL inside. The second connection section 108 is provided with the opening of the discharge path 109 facing the direction of the straight line L2, which is orthogonal to the straight line L1. The opening of the discharge path 109 is a second discharge outlet for the oil OL in the strainer 10.

On the base 105b side of the first connection section 105, the second connection section 108 bulges upwards such that the upper end of the second connection section 108 is positioned above the first connection section 105 (see FIG. 8).

As shown in FIG. 7, the opening direction of the discharge path 109 inside the second connection section 108 and the opening direction of the discharge path 107 inside the first connection section 105 are orthogonal, as viewed from above.

As shown in FIG. 6, the discharge path 107 inside the first connection section 105 is inclined at a prescribed angle θ1 relative to the horizontal line HL that intersects the straight line L2, and the first connection section 105 is inclined in a direction positioned on the upper side in the vertical line VL direction approaching the tip 105a side.

As shown in FIG. 6, the discharge path 109 inside the second connection section 108 and the discharge path 107 inside the first connection section 105 open into the space S10 inside the strainer 10.

As shown in FIG. 7, the second connection section 108 is positioned near the straight line L1 that passes approximately through the center of the upper case 101.

In the upper case 101, a recess 110 (cut-out) toward the lower case 102 (the side away from the viewer in FIG. 7) is provided in a region located along the extension of the discharge path 109 of the second connection section 108.

That is, when the strainer 10 is viewed from the side, the discharge path 109 of the second connection section 108 is fully exposed. Therefore, a cylindrical member 130 shown in FIG. 5 can be inserted into the discharge path 109 from the side of the strainer 10 without interfering with the upper case 101.

Here, a smaller diameter section 109*a* (see FIG. 7) having a smaller inner diameter than the discharge path 109 is provided along the discharge path 109. The cylindrical member 130 inserted into the discharge path 109 is inserted into the discharge path 109 until the cylindrical member is in contact with the smaller diameter section 109*a*.

As shown in FIG. 5, in this embodiment, the second connection section 108 of the strainer 10 and the connection section 625 on the partition section 62 side are connected via the cylindrical member 130 inserted into the discharge path 109 and the connection port 625*a*.

In this state, the discharge path 109 of the strainer 10 communicates with the oil path 626 inside the partition section 62 through the cylindrical member 130 and the connection port 625*a* of the connection section 625.

Therefore, after the cylindrical member 130 is inserted into the discharge path 109 on the strainer 10 side, the strainer 10 is moved closer to the partition section 62 from the first chamber S1 side, and the cylindrical member 130 is inserted into the connection port 625*a* of the connection section 625, thereby connecting the discharge path 109 and the oil path 626 through the connection section 625.

It is also possible to first insert the cylindrical member 130 into the connection port 625*a* of the connection section 625 at this time.

As shown in FIG. 6, the strainer 10 is assembled onto the mechanical oil pump MOP by inserting the tip 105*a* side of the first connection section 105 into the connection port 120 of the mechanical oil pump MOP. The mechanical oil pump MOP is made to be assembled onto the partition section 62, and the strainer 10 is supported by the partition section 62 via the mechanical oil pump MOP.

Figure 9:
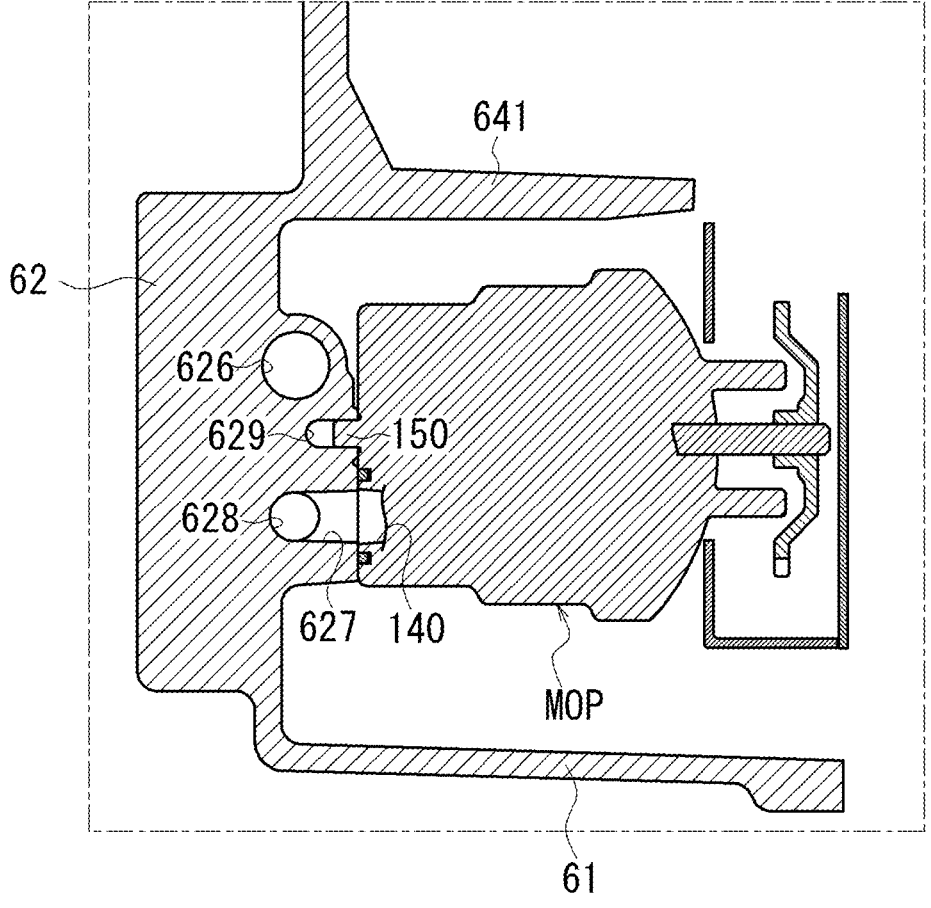
FIG. 9 is a diagram of a support structure of a mechanical oil pump in the partition section.

FIG. 9 is a diagram illustrating the support structure of the mechanical oil pump MOP in the partition section 62. FIG. 9 shows a schematic cross section of the mechanical oil pump MOP through line A-A in FIG. 6.

As shown in FIG. 9, the surface of the mechanical oil pump MOP facing the partition section 62 is provided with a positioning projection 150 and a discharge outlet 140 for the oil OL.

In the partition section 62, an insertion hole 629 and the connection section 627 are open in the surface facing the mechanical oil pump MOP.

The mechanical oil pump MOP is positioned at a prescribed location on the partition section 62 by inserting the projection 150 into the insertion hole 629 of the partition 62. In this state, the mechanical oil pump MOP is fixed to the partition section 62 by bolts, not shown.

Once the mechanical oil pump MOP is fixed to the partition section 62, the discharge outlet 140 of the mechanical oil pump MOP is disposed in a position facing the connection section 627 on the partition section 62 side, and the discharge outlet 140 and the connection section 627 communicate. The connection section 627 communicates with the oil path 628 inside the partition section 62. Therefore, the oil OL discharged from the discharge outlet 140 of the mechanical oil pump MOP passes through the connection section 627 and is supplied to the oil path 628.

Figure 10:
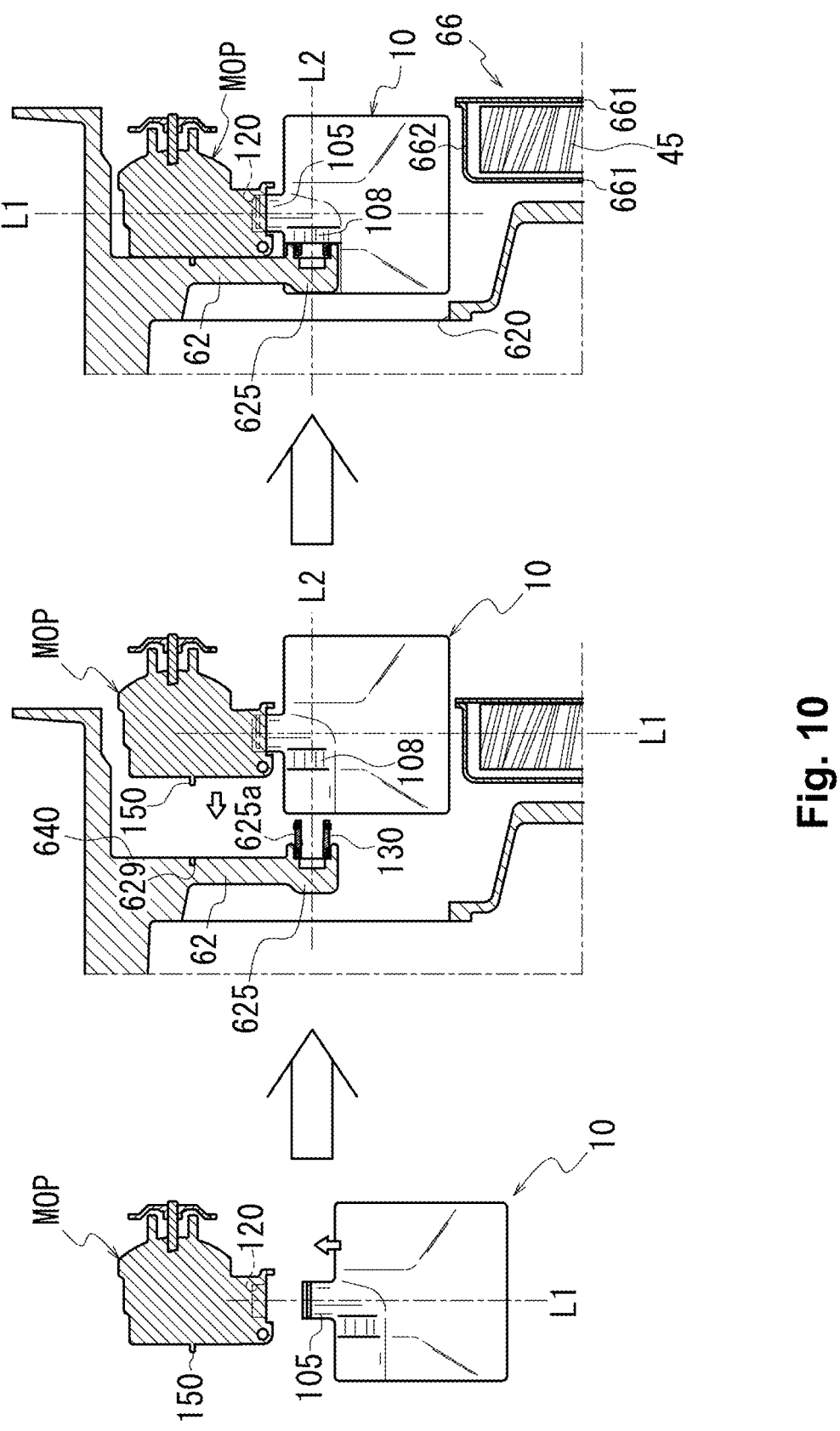
FIG. 10 is a diagram for explaining the process of mounting the strainer and the mechanical oil pump to the partition section.

FIG. 10 is a diagram illustrating the process of mounting the strainer 10 and the mechanical oil pump MOP onto the partition section 62.

Initially, the first connection section 105 of the strainer 10 is inserted into the connection port 120 of the mechanical oil pump MOP in the direction of the straight line L1, thereby assembling the strainer 10 onto the mechanical oil pump MOP.

The insertion direction (displacement direction) of the strainer 10 during this process aligns with the mounting surface 640 of the partition section 62 and is orthogonal to the mounting direction (straight line L2 direction) of the mechanical oil pump MOP relative to the partition section 62.

The subassembly of the mechanical oil pump MOP to which the strainer 10 has been assembled is then displaced in the straight line L2 direction orthogonal to the straight line L1, positioning the projection 150 of the mechanical oil pump MOP in the insertion hole 629 of the partition section 62.

At this time, the cylindrical member 130 is inserted into the connection port 625*a* of the connection section 625, and, concurrently with the insertion of the projection 150 into the insertion hole 629, the cylindrical member 130 is inserted into the second connection section 108 of the strainer 10.

As a result, the strainer 10 is supported in two places, the connection section 625 and the mechanical oil pump MOP. If the strainer 10 is supported only by the mechanical oil pump MOP, vibration during the operation of the vehicle V in which the power transmission device 1 is mounted could cause the strainer 10 to rotate about the straight line L1.

The cylindrical member 130 inserted into the second connection section 108 from the direction of straight line L2 restricts the rotation of the strainer 10 about the straight line L1.

In this state, the strainer 10 is arranged so that part of the strainer 10 reaches the bottom of the partition section 62. Specifically, as shown in FIG. 5, part of the strainer 10 is arranged extending into the opening 620.

If the opening 620 were not provided, the position of the strainer 10 would need to be shifted in the direction away from the lower region Rx in the direction of the axis of rotation X1 (to the right in FIG. 5) to arrange the strainer 10 so as to avoid interfering with the lower region Rx on the circumferential wall section 61 side. In such a case, the housing HS (the case 6) could possibly increase in size in the direction of the axis of rotation X1.

As described, part of the strainer 10 can be arranged reaching the opening 620, making it possible to favorably prevent an increase in size of the housing HS (the case 6) in the direction of the axis of rotation X1.

As described above, the power transmission device 1 for a vehicle according to the present embodiment has the following configuration.

(1) The power transmission device 1 has
    a power transmission mechanism (the torque converter T/C, the forward-reverse switching mechanism 2, the variator 3, the reduction mechanism 4, and the differential device 5) that transmits driving force from the engine ENG (drive source) to the drive wheels WH, WH,
    a housing HS that accommodates the power transmission mechanism,
    a partition section 62 that supports the rotating shaft of the power transmission mechanism and divides the interior of the housing HS, a strainer 10 arranged at the bottom of the housing HS, and a mechanical oil pump MOP (pump) supported by the partition section 62, The housing HS is internally provided with a first chamber S1 located on one side of the partition section 62 in the direction of the axis of rotation X of the power transmission device, and a second chamber S2 located on the other side of the partition section 62 in the direction of the axis of rotation X.

The strainer 10 has a first connection section 105 (the first connection port) that connects to the mechanical oil pump MOP, and a second connection section 108 (the second connection port) that connects to the oil path 626 (the second oil path) inside the partition section 62.

The second connection section 108 connects to the oil path 626 from the direction of assembly of the mechanical oil pump MOP to the partition section 62.

With this configuration, since the strainer 10 is supported at two points, i.e., the mechanical oil pump MOP attached to the partition section 62 and the partition section 62, the support stability of the strainer 10 is ensured.

Further, after assembling the strainer 10 to the mechanical oil pump MOP, assembling the mechanical oil pump MOP to the partition section 62 completes the connection between the second connection section 108 of the strainer 10 and the oil path 626 on the side of the partition section 62.

This can simplify the connection configuration between the strainer 10 and the oil path 626. Using the oil path 626 in the partition section 62 of the case 6 (the internal oil path in the case), oil OL suctioned through the strainer 10 can be supplied to units farther along the oil path 626, such as the electric oil pump EOP or the control valve CV.

That is, by assembling the mechanical oil pump MOP (pump), to which the strainer 10 has been assembled, to the partition section 62, the arrangement of the mechanical oil pump MOP and the strainer 10 within the housing HS is completed.

By assembling the strainer 10 to the mechanical oil pump MOP into a subassembly, the strainer 10 and the mechanical oil pump MOP can be arranged simply within the housing HS. Further, the support structure of the strainer 10 can be simplified.

Additionally, there is no need to provide separate piping to connect the second connection section 108 of the strainer 10 with the units within the housing HS. Therefore, the total parts count required to connect the second connection section 108 of the strainer 10 with the units can be reduced. If separate piping were installed, the piping would need to be provided bent to avoid interfering with other components within the housing HS. By not requiring such piping, the oil path length from the second connection section 108 of the strainer 10 to the units can be shortened.

(i) An opening 620 (communication hole) that connects the first chamber S1 and the second chamber S2 is provided at the bottom of the partition section 62.

As viewed from the vertical line VL direction based on the installation state of the power transmission device 1 in the vehicle V, part of the strainer 10 is positioned within the opening 620 and is arranged to overlap the partition section 62.

If the strainer 10 is positioned avoiding the partition section 62, the width of the housing HS in the direction of the axis of rotation of the power transmission mechanism might increase.

By placing the strainer 10 in the housing section 67, which is provided to overlap the partition section 62, as viewed from the vertical line VL direction, the strainer 10 can be arranged to overlap the partition section 62, as viewed from the vertical line VL direction. This results in a compact arrangement structure for the strainer 10 which can be housed within the housing HS, reducing the possibility of an increase in size of the width of the housing HS in the direction of the axis of rotation of the power transmission mechanism.

(2) In the plastic strainer 10, a recess 110 is provided on the side of the partition section 62, as viewed from the second connection section 108, to avoid interference with the partition section 62.

With this configuration, as viewed from the assembly direction of the mechanical oil pump MOP onto the partition section 62, the second connection section 108 region of the strainer 10 is arranged to overlap the partition section 62. In this state, since the strainer 10 has the recess 110 to avoid interference with the partition section 62, the main body of the strainer 10 can be placed across the lower side of the partition section 62 in the direction of the axis of rotation X1.

This allows for securing the area of the strainer 10, as viewed from the vertical line VL direction, while positioning the strainer 10 closer to the upper side in the vertical line direction, ensuring the volume of the strainer 10.

(3) The assembly direction (straight line L1 direction) of the first connection section 105 of the strainer 10 and the mechanical oil pump MOP is a direction intersecting, preferably at a right angle, the assembly direction (straight line L2 direction) of the mechanical oil pump MOP onto the partition section 62.

If the connection part of the strainer 10 is only the first connection section 105, it is necessary to restrict the rotation of the strainer 10 around the straight line L1, which may increase the required parts count.

By connecting the second connection section 108 of the strainer 10 to the partition section 62, it is possible to have two connections with other components of the strainer 10. This more reliably restricts the rotation of the strainer 10 assembled onto the mechanical oil pump MOP. Since there is no need for additional parts to restrict the rotation of the strainer 10, it is possible to prevent increased costs due to an increased parts count.

(4) Inside the first chamber S1 are provided the circumferential wall section 641 that surrounds the outer circumference of a first rotational element (the forward-reverse switching mechanism 2) constituting the power transmission mechanism, and the housing section 67 provided in the vertical line direction based on the installation state of the power transmission device 1 in the vehicle V, extending from the bottom of the circumferential wall section 641 along the axis of rotation X to the partition section 62.

The strainer 10 is located in the housing section 67.

As viewed from the axis X direction of the power transmission device 1, an opening 620 (communication hole) that connects the first chamber S1 and the second chamber S2 is provided in the region of the partition section 62 that overlaps the housing section 67.

With this configuration, the housing section 67 in the housing HS functions as a through-part (through-hole) that connects the lower part of the first chamber S1 and the lower part of the second chamber S2. As a result, the oil OL in the first chamber S1 and the oil OL in the second chamber S2 is collected in the housing section 67 located at the bottom of the housing HS, allowing for an increase in the amount of oil OL suctioned through the strainer 10.

Additionally, since the circumferential wall section 641 is located between the housing section 67 and the region 651 that houses the forward-reverse switching mechanism 2 (the first rotational element), it is possible to minimize the fluctuation of the oil OL level in the housing section 67 caused by the rotation of the rotational elements included in the forward-reverse switching mechanism 2. Large fluctuations in the oil OL level in the housing section 67 can cause air to be drawn through the strainer 10, but reducing such a possibility ensures stable suction of oil OL through the strainer 10.

When the oil OL suctioned through the strainer 10 is used for the operation and lubrication of the power transmission mechanism, the oil OL can be stably supplied to the oil pressure control circuit side, ensuring appropriate operation and lubrication of the power transmission mechanism.

(5) Inside the first chamber S1 are provided
  the final gear 45 (second rotational element) positioned on the lower side toward the rear of the vehicle relative to the forward-reverse switching mechanism 2 (first rotational element), and
  the baffle plate 66 that surrounds the outer circumference of the final gear 45 is provided.

As viewed from the direction of the axis of rotation X of the power transmission device 1, the strainer 10 is positioned between the axis of rotation X1 of the forward-reverse switching mechanism 2 and the axis of rotation X4 of the final gear 45.

In the power transmission device 1, there is extra space between the axis of rotation X1 of the forward-reverse switching mechanism 2 and the axis of rotation X4 of the final gear 45. Placing the strainer 10 in this space allows the strainer 10 to be positioned closer to the upper side in the vertical direction. This appropriately prevents an increase in the size of the power transmission device 1 in the vertical line VL direction.

(6) As viewed from the direction of the axis of rotation X of the power transmission device 1, the strainer 10 is disposed in a location intersecting the tangent line Lm.

The tangent line Lm connects the circumferential wall section 641, which follows the lower outer circumference of the forward-reverse switching mechanism 2 (first rotational element), and the arcuate wall section 662 of the baffle plate 66, which follows the lower outer circumference of the final gear 45 (second rotational element).

In the power transmission device 1, the region between the circumferential wall section 641 and the arcuate wall section 662 tends to be unused dead space, but this dead space can be effectively utilized to provide the opening 620 and the strainer 10. Specifically, by positioning the strainer 10 closer to the region between the circumferential wall section 641 and the arcuate wall section 662, it is possible appropriately to prevent an increase in size of the case 6 in the vertical direction due to the provision of the strainer 10.

(ii) In the housing HS, the housing section 67 is positioned on the lower side in the vertical line VL direction, based on the installation state of the power transmission device 1 in the vehicle V, as viewed from the axis of rotation X1 of the forward-reverse switching mechanism 2 (first rotational element) and the axis of rotation X4 of the final gear 45 (second rotational element).

The baffle plate 66, which surrounds the outer circumference of the final gear 45 (second rotational element), is provided on the side of the first chamber S1.

The opening 620 is located in a position intersecting the tangent line Lm that connects the outer circumference of the arcuate circumferential wall section 641 that surrounds the forward-reverse switching mechanism 2 and the outer circumference of the arcuate wall section 662 of the baffle plate 66 surrounding the final gear 45.

The opening 620 is formed from the region between the circumferential wall section 641 and the arcuate wall section 662, crossing the tangent line Lm from above to below, extending downward to the bottom of the case 6.

The strainer 10 is positioned to overlap the opening 620, as viewed from the direction of the axes X1 and X4.

In the power transmission device 1, the region between the circumferential wall section 641 and the arcuate wall section 662 tends to become unused dead space, but this dead space can be effectively utilized to provide the opening 620 and the strainer 10. Specifically, by positioning the strainer 10 closer to the region between the circumferential wall section 641 and the arcuate wall section 662, it is possible appropriately to prevent an increase in the size of the case 6 in the vertical direction due to the provision of the strainer 10.

(iii) The mechanical oil pump MOP is positioned on the side of the strainer 10 toward the front of the vehicle.

The forward-reverse switching mechanism 2 (first rotational element) is positioned above on the vehicle front side of the final gear 45 (second rotational element). Therefore, on the vehicle front side of the strainer 10, there is more space in the vertical line VL direction than the rear side.

By positioning the mechanical oil pump MOP laterally on the side of the strainer 10 toward the front of the vehicle, it is possible appropriately to prevent an increase in size of the case 6 of the power transmission device 1 in the vertical direction.

(iv) The power transmission device 1 has
  a power transmission mechanism that transmits the driving force from the engine ENG (drive source) to the drive wheels WH, WH,
  a housing HS that accommodates the power transmission mechanism,
  a control valve CV that controls the pressure of the oil OL supplied to the power transmission mechanism, and
  pumps that supply oil OL to the control valve CV (electric oil pump EOP and mechanical oil pump MOP).

The housing HS has
  a partition section 62 that supports the rotary shaft of the power transmission mechanism,
  a first chamber S1 located on one side of the partition section 62 in the direction of the axis of rotation X of the power transmission mechanism,
  a second chamber S2 located on the other side of the partition section 62 in the direction of the axis of rotation X, and
  a housing chamber S3 located on the vehicle front side of the first chamber S1 and the second chamber S2.

The control valve CV and the electric oil pump EOP are arranged upright within the housing chamber S3. The control valve CV and the electric oil pump EOP are aligned in the direction of the axis of rotation X of the power transmission mechanism within the housing chamber S3.

As viewed from the direction of the axis of rotation X of the power transmission mechanism, within the first chamber S1, the strainer 10 supported by the mechanical oil pump MOP is positioned between the input shaft (axis of rotation X1) and the output shaft (axis of rotation X4) of the power transmission mechanism.

The strainer 10 has a first connection section 105 (first connection port) that connects to the mechanical oil pump MOP, and the second connection section 108 (second connection port) that connects to an oil path 626 (second oil path) inside the partition section 62.

The second connection section 108 connects to the oil path 626 from the direction of assembly of the mechanical oil pump MOP to the partition section 62.

Additionally, for instance, in a power transmission device in which the control valve CV is horizontally aligned in the lower part of the housing HS, the strainer 10 was attached to the control valve CV.

In the case of the power transmission device 1 in which the control valve CV is arranged upright on the vehicle front side of the housing HS, the control valve CV is located in a different housing chamber S3 from the first chamber S1 where the strainer 10 is positioned.

Therefore, the control valve CV cannot be used to support the strainer 10.

With this configuration, the strainer 10 is supported at two points, the mechanical oil pump MOP attached to the partition section 62, and the partition section 62, ensuring the support stability of the strainer 10.

In the foregoing embodiment, a case was illustrated in which the power transmission device 1 transmits the rotation of the engine ENG to the drive wheels WH, WH, but it is also possible for the power transmission device 1 to transmit the rotation of at least one of the engine ENG or the motor (rotating electrical machine) to the drive wheels WH, WH. For example, it is possible to use a single-motor, double-clutch power transmission device (in which the motor is arranged between the engine ENG and the power transmission device, a first clutch is disposed between the engine ENG and the motor, and a second clutch is arranged inside the power transmission device 1).

Further, in the foregoing embodiment, a case was illustrated in which the power transmission device 1 has a shifting function, but it is also possible for the power transmission device simply to reduce speed (or increase speed) without a shifting function. If the power transmission device does not have a shifting function and instead reduces and transmits the rotation of the motor to the drive wheels WH, WH, the oil pressure control circuit for supplying the oil OL for cooling the motor and the oil OL for lubricating the reduction mechanism is arranged in the housing chamber S3 with the electric oil pump EOP. Further, in the foregoing embodiment, a case was illustrated in which the control unit of the power transmission device 1 was provided with the control valve CV, but if the power transmission device 1 does not have a shifting mechanism and the drive source is a motor (rotating electrical machine) and not the engine ENG, then the control unit may be provided with an inverter or the like for controlling driving of the motor.

Embodiments of the present invention have been described above, but the present invention is not limited only to those aspects shown in the embodiments. The present invention may be appropriately modified within the scope of the technical concept of the invention.

DESCRIPTION OF THE REFERENCE SYMBOLS

1 Power transmission device (power transmission mechanism); 2 Forward-reverse switching mechanism (power transmission mechanism: first rotational element); 3 Variator (power transmission mechanism); 4 Reduction mechanism (power transmission mechanism); 45 Final gear (second rotational element); 5 Differential device (power transmission mechanism); 6 Case; 61 Circumferential wall section; 62 Partition section; 66 Baffle plate; 662 Arcuate wall section; 67 Housing section; 7 First cover; 8 Second cover; 9 Third cover; 10 Strainer; 105 First connection section (first connection port); 107 Discharge path; 108 Second connection section (second connection port); 109 Discharge path; 110 Recess; 120 Connection port; 620 Opening (communication hole); 626 Oil path (second oil path); 628 Oil path (first oil path); 641 Circumferential wall section; HS Housing; MOP Mechanical oil pump (pump); OL Oil; S1 First chamber; S2 Second chamber; and X1-X4: Axes of rotation.

The invention claimed is:

1. A power transmission device for a vehicle, comprising:
a housing that accommodates a power transmission mechanism;
a partition section that supports the power transmission mechanism and divides an interior of the housing;
a strainer arranged at a bottom of the housing; and
a pump assembled onto the partition section, wherein
the housing defines
a first chamber located on one side of the partition section in a direction of an axis of rotation of an input shaft of the power transmission device, and
a second chamber located on the other side of the partition section in the direction of the axis of rotation of the input shaft of the power transmission device, and
the strainer has
a first connection port that connects to the pump, and
a second connection port that connects to an oil path inside the partition section, the second connection port being connected to the oil path from a direction of assembly of the pump onto the partition section so that the second connection port is connected to the oil path on a side of the partition section that is the same as the side of the partition section to which the pump is assembled onto.

2. The power transmission device according to claim 1, wherein
in the strainer, a recess for avoiding interference with the partition section is provided on a partition section side as viewed from the second connection port.

3. The power transmission device according to claim 1, wherein
a direction of assembly of the first connection port and the pump is a direction intersecting the direction of assembly of the pump onto the partition section.

4. The power transmission device according to claim 1, wherein
the first chamber is internally provided with
a circumferential wall section that surrounds an outer circumference of a first rotational element constituting the power transmission mechanism, and
a housing section provided at a bottom of the circumferential wall section and extending to the partition section along the axis of rotation of the input shaft of the power transmission device,
the strainer is provided in the housing section, and
a communication hole is provided in a region in the partition section overlapping the housing section as viewed from the direction of the axis of rotation of the input shaft of the power transmission device.

5. The power transmission device according to claim 4, wherein the first chamber is internally provided with a second rotational element provided below the first rotational element toward a rear of the vehicle, and a cover surrounding an outer circumference of the second rotational element, and the strainer is located between an axis of rotation of the first rotational element and an axis of rotation of the second rotational element as viewed from the direction of the axis of rotation of the input shaft of the power transmission device.

6. The power transmission device according to claim 5, wherein the strainer is disposed in a position intersecting a tangent line connecting an outer circumference of a bottom of the first rotational element and an outer circumference of a bottom of the second rotational element as viewed from the direction of the axis of rotation of the input shaft of the power transmission device.

\* \* \* \* \*